United States Patent Office 3,490,931
Patented Jan. 20, 1970

3,490,931
ALKALI SILICATE CONCRETES
John J. Petkus, Whiting, Ind., assignor to Standard Oil Company, Chicago, Ill., a corporation of Indiana
No Drawing. Filed Dec. 27, 1965, Ser. No. 516,764
Int. Cl. C09d 1/02
U.S. Cl. 106—84       4 Claims

ABSTRACT OF THE DISCLOSURE

A chemically setting acid-resistant cement product prepared from a mix comprising: (a) silica sand, (b) silicate of soda, (c) silica flour, (d) sodium silico fluoride coated with oil, and (e) a fully basic sodium phosphate of the group consisting of sodium orthophosphate, sodium tripolyphosphate, sodium hexametaphosphate, the combined amounts of said sodium silico fluoride and said phosphate being effective to cause said acid-resistant cement product to set.

---

This invention relates to acid-resistant cement products. More particularly, it relates to chemically-setting acid-resistant cement products containing silicate of soda as a binder.

Acid-resistant compositions of cements, mortars and concrete employing silicate of soda as a cementitious agent are well known. Such acid-resistant cements generally consist of a silicate of soda solution, an acidic setting agent and an acid-resistant aggregate, and these cements set chemically, rather than by drying. Almost all of these cements have compressive strengths not exceeding about 2,500 p.s.i., which is considered too low to enable these materials to be widely used in concrete construction. Present silicate of soda cements are also subject to severe restrictions in their use for resistance to sulfuric acid, because of sulphate disintegration which occurs when sulfuric acid permeates the cement and combines with free or loosely bound sodium. This mechanism is believed to result in the formation of sodium sulphate which is deposited as anhydrous Na$_2$SO$_4$ crystals in pores close to the exposed faces of the cement. The presence of moisture then causes hydration to Glauber's salt $$Na_2SO_4 \cdot 10H_2O$$

with resultant expansion forces which disrupt the cement and cause it to crack and distintegrate.

Chemically-setting, acid-resistant cement products, e.g. cements, mortars, concretes, etc., having increased resistance to sulfate disintegration are the subject matter of U.S. Patent No. 3,138,471, the disclosure of which is incorporated by reference herein and made a part hereof.

The cement mix ingredients employed in the preparation of such cement products are generally within the following proportions:

| | Parts by weight |
|---|---|
| Fine acid-resistant aggregate | 1,000 |
| sodium silicate | 100 to 250 |
| Very fine acid-resistant aggregate | 200 to 1,000 |
| Setting agent | 12 to 500 |
| Alkali metal phosphate | 6 to 100 |
| Water, as needed for consistency. | |

The preferred range of mix components is:

| | Parts by weight |
|---|---|
| Graded silica sand | 525 |
| Sodium silico-fluoride | 10 to 150 |
| Sodium phosphate | 6 to 28 |
| Silica flour | 280 to 410 |
| Silicate of soda solution (37.6% solids) | 200 to 250 |
| Water | 0 to 20 |

The preferred mix formation is:

| | Parts by weight |
|---|---|
| Silica sand, 20–30 mesh | 525 |
| Silica flour, passing 325 mesh | 350 |
| Sodium silico-fluoride, passing 100 mesh | 50.8 |
| Sodium tripolyphosphate, passing 100 mesh | 15 |
| Silicate of soda (37.6% solids), 1:3.22 soda to silica ratio | 234 |
| Water | Not to exceed 15 |

The working time of chemically-setting wet alkali silicate cement mixes is of extreme importance for the effective utilization of such mixes for making acid-resistant cement products. In the art, the term "working time" refers to that period of time between the formation of a wet mix and the setting (solidification) thereof into an unworkable mass. The working time of the wet alkali silicate mixes, referred to above, is about 15 minutes. In other words, such wet mixes set in about 15 minutes into a solidified and unworkable mass. This short working time thus severely limits the use of such cement mixes for many purposes.

It has been discovered that a 3 to 5-fold increase in working time of the chemically-setting mixes, described herein to form acid-resistant cement products having increased resistance to sulfate disintegration, can be obtained by using oil-coated particulate sodium silico-fluoride solids as the setting or precipitating agent. This increased working time is achieved without adversely effecting the desired physical and chemical properties of the set products prepared in accordance with the teachings of the aforesaid patent. Accordingly, the present invention is directed to the improvement of the working time of the chemically-setting acid-resistant cement compositions of the aforesaid patent.

Any of the conventional coating techniques used for applying an oil coating to a particulate solid can be used to prepare the particulate oil-coated sodium silico-fluoride solids for use in this invention. Desirably, the oil should have a vicosity of about 360–4,000 SSU at 100° F. so as to minimize oil loss from the surface of the coated particulate solids prior to addition to the mix ingredients. Alternatively, the particulate solids can be dispersed in oil and an invert emulsion, that is a water-in-oil emulsion, formed therefrom and this emulsion then added to the other mix ingredients. Such invert emulsions are well known in the art and can be prepared with suitable surface-active agents in a high-speed mixer or colloid mill.

The improved working time of the chemically-setting acid-resistant cement compositions, described herein, is advantageously secured by premixing all of the mix ingredients prior to the incorporation of the oil-coated particulate sodium silico-fluoride solids in the wet mix. The use of the oil-coated sodium silico-fluoride solids, which functions as the setting agent for the mixes, thus provides a sufficiently long and liable setting or working time to permit mixing, handling, and placement of the materials.

I claim:

1. In a chemically setting acid-resistant cement product prepared from a mix comprising: (a) silica sand, (b) silicate of soda, (c) silica flour, (d) sodium silico fluoride, and (e) a fully basic sodium phosphate of the group consisting of sodium orthophosphate, sodium tripolyphosphate, sodium hexametaphosphate, the combined amounts of said sodium silico fluoride and said phosphate being effective to cause said acid-resistant cement product to set; the improvement wherein said sodium silico fluoride is coated with an oil having a viscosity in the range of about 360 to 4000 SSU at 100° F., said oil being present in an amount sufficient to increase the working time of said cement product about 3 to 5 fold.

2. A chemically setting acid-resistant cement product prepared from a mix comprising: (a) silica sand in an amount of about 1,000 parts by weight, (b) silicate of soda in an amount between about 100 to about 250 parts by weight, (c) silica flour in an amount between about 200 and about 1,000 parts by weight, (d) sodium silico fluoride in an amount between about 12 and about 500 parts by weight, said sodium silico fluoride being coated with an oil having a viscosity in the range of about 360 to 4000 SSU at 100° F., and said oil being present in an amount sufficient to increase the working time of said cement product about 3 to 5 fold, and (e) a fully basic sodium phosphate of the group consisting of sodium orthophosphate, sodium tripolyphosphate, sodium hexametaphosphate in an amount between about 6 and about 100 parts by weight.

3. A chemically setting acid-resistant cement product prepared from a mix comprising: (a) silica sand in an amount of about 525 parts by weight, (b) 200 to about 250 parts by weight of silicate of soda solution (37.6% solids), (c) silica flour in an amount between about 410 parts by weight, (d) sodium silico fluoride in an amount between about 10 and about 150 parts by weight, said sodium silico fluoride being coated with an oil having a viscosity in the range of about 360 to 4000 SSU at 100° F., and said oil being present in an amount sufficient to increase the working time of said cement product about 3 to 5 fold, and (e) a fully basic sodium phosphate of the group consisting of sodium orthophosphate, sodium tripolyphosphate, sodium hexametaphosphate in an amount between about 6 to about 28 parts by weight.

4. A chemically setting acid-resistant cement product prepared from a mix comprising: (a) 20 to 30 mesh silica sand in an amount of about 525 parts by weight, (b) 230 parts by weight of silicate of soda solution (37.6% solids), silica flour in an amount of about 350 parts by weight of about 325 mesh silica flour, (d) sodium silico fluoride in an amount of about 50 parts by weight, said sodium silico fluoride being coated with an oil having a viscosity in the range of about 360 to 4000 SSU at 100° F., said oil being present in an amount sufficient to increase the working time of said cement product about 3 to 5 fold, and (e) a fully basic sodium phosphate of the group consisting of sodium orthophosphate, sodium tripolyphosphate, sodium hexametaphosphate in an amount of about 15 parts by weight.

References Cited
UNITED STATES PATENTS 3,138,471  6/1964  Wygant _____ 106—84

JAMES E. POER, Primary Examiner